United States Patent Office 2,759,829
Patented Aug. 21, 1956

2,759,829

STABILIZATION OF FATS AND OILS

Karl F. Mattil, Chicago, and Rex J. Sims, La Grange, Ill., assignors to Swift & Company, Chicago, Ill., a corporation of Illinois No Drawing. Application April 27, 1953,
Serial No. 351,504

12 Claims. (Cl. 99—163)

The present invention relates in general to the stabilization of fats and oils, and more particularly to a method for reducing discoloration attendant the use of certain types of antioxidants in fats and oils, and to antioxidant compositions for use in accordance with said method.

It has been known that polyphenolic antioxidants are very effective in stabilizing oils and fats used in triglyceride shortenings against the development of rancidity. However, a number of the better antioxidants of this class have been found to have a pronounced tendency to produce discoloration in the products to which they are added. This discoloration problem is overcome to some extent by the addition of acidic compounds such as citric acid or the like. Antioxidant mixtures containing an acidic stabilizer have been used with varying degrees of success. Since the citric acid and some of the polyphenolic antioxidants are not readily soluble in fat, these antioxidant mixtures have generally been added to fats as solutions in a propylene glycol solvent. However, the tendency to discolor still exists in these antioxidant mixtures, and is particularly noticeable in the case of icings made from shortenings containing such antioxidant mixtures added alone or in propylene glycol solution. The icings will develop a very undesirable gray color which makes the use of such antioxidants for this purpose impractical. Likewise, and even more pronounced, has been the development of gray-green colors in scrambled eggs containing the antioxidant mixtures referred to above. The use of these antioxidants alone, or in propylene glycol solution, with or without citric acid added, results in the development of such discoloration.

It is therefore an object of the present invention to provide a method for inhibiting the discoloration-producing tendencies of polyphenolic fat antioxidants.

It is a further object of this invention to provide an antioxidant composition, containing polyphenolic antioxidants having a tendency to produce discoloration, which will not tend to discolor fats and oils to which it may be added.

Additional objects, if not specifically set forth herein, will be readily apparent to one skilled in the art from the following detailed description of the invention:

Generally, the present invention comprises the discovery that by dissolving polyphenolic fat antioxidants which possess discoloring tendencies in a fatty acid partial ester of a polyhydroxy compound, the discoloration tendencies of such antioxidant are greatly reduced.

More specifically, it has been found that fatty acid partial esters of polyhydroxy compounds, and particularly monoglycerides, used as a solvent for polyphenolic antioxidants of the discoloration-producing type, effectively inhibit the discoloration of triglyceride shortenings to which the antioxidant solution is added.

The most commonly used polyphenolic antioxidants of the discoloration-producing type are propyl gallate, gallic acid and NDGA (nordihydroguaiaretic acid), although the scope of the present invention is intended to cover all polyphenolic antioxidants which possess the discoloration-producing tendency.

It is preferred to use an acidic stabilizer in conjunction with the polyphenolic compound, but it is not absolutely essential. Examples of acidic stabilizers which may be used are citric acid, phosphoric acid, aconitic acid or the like. The amounts and proportions of the acidic stabilizer are known to the art, and any workable range is considered within the scope of the present invention. In general, amounts within the range of 0.001% to 0.01% have proven satisfactory, based on the weight of the fat in which the antioxidant mixture is incorporated.

As solvent, it is essential that a fatty acid partial ester of a polyhydroxy compound be used. Commercially available monoglyceride compositions are preferred. Such preparations are well known in the art and may be made from either animal or vegetable fats, with or without previous hydrogenation. These compositions, contain generally about 40% of the monostearyl, monooleyl, and/or monopalmityl glycerides or mixtures thereof, with the balance comprising a mixture of di- and triglycerides which, however, do not detract from the usefulness of the compositions when employed in accordance with the present invention. It is also within the scope of this invention to use molecularly distilled monoglycerides or the like.

In accordance with the present invention, it is necessary to incorporate the antioxidant into the solvent prior to the addition of the mixture to the fatty material to be treated. The addition of the solvent, monoglyceride for example, to a fat containing the antioxidant or the addition of the antioxidant to a fat containing added monoglyceride has no effect on the prevention of discoloration due to the antioxidant. It is necessary to secure uniform distribution of the antioxidant throughout the fat, and accordingly, it is preferred to heat the fat above its melting point and then add the antioxidant solution with stirring.

The following specific example is for the purpose of illustration only and does not constitute any limitation on the scope of the present invention other than as appears in the appended claims:

Example I

Twenty grams of unstabilized prime steam lard were heated in an open kettle to its incipient smoke point and then 110 grams of homogenized whole eggs were added thereto. When the eggs had coalesced, they were transferred to a plate, aged an hour at room temperature to accentuate the color differences, and then photographed in color. This sample was used as a control and may be designated as "A."

A second batch, in the same amount, was prepared in identical manner, with the exception that 0.1% by weight based on the lard of an antioxidant mixture of 20% butylated hydroxyanisole, 6% propyl gallate, and 4% citric acid dissolved in 70% propylene glycol was added to the lard before heating. This sample was also photographed in the same manner as the control, and may be designated as "B."

A third batch, prepared in like manner, was treated in accordance with the method of the present invention, i. e., 0.13% by weight based on the lard of an antioxidant dissolved in monoglyceride was added. The antioxidant solution prepared for this test was made by heating a mixture of 12 grams propyl gallate, 8 grams citric acid, 40 grams butylated hydroxyanisole with 200 grams of a commercial monoglyceride preparation (made from a partially hydrogenated vegetable oil) to 180° F. with stirring. The antioxidant solution was then incorporated into the lard by heating the lard and antioxidant solution to 150° F. while stirring. The eggs prepared with this lard were also photographed and may be identified as sample "C."

A comparison of the color transparencies made in the manner described above shows a marked discoloration in the case of sample "B," i. e., polyphenolic antioxidant in propylene glycol solution, as contrasted with the clear golden color of sample "C" containing polyphenolic antioxidant in monoglyceride solution.

Example II

A second test conducted in the identical manner of Example I was run, substituting an identical percentage of gallic acid for the propyl gallate throughout. The results were the same as those described in connection with Example I.

Example III

Nordihydroguaiaretic acid (NDGA) was then substituted for the propyl gallate of Example I, and a third series of comparative tests made. The only difference in procedure or proportions was that the percentage of NDGA was 3% instead of the 6% propyl gallate solution. Again the results showed a substantial discoloration in all samples except that prepared with the antioxidant mixture in monoglyceride solution.

The exact amounts of an antioxidant composition to be added to any fat in accordance with the present invention will vary depending on the fat, the conditions under which the fat is to be used, the exact polyphenolic antioxidant used, and the like. However, in all cases, using an antioxidant mixture prepared in accordance with the present invention, it is possible to add much greater amounts of polyphenolic antioxidants to fats than has heretofore been considered possible without producing discoloration effects on the fat. The antioxidant properties, per se, are not altered, and accordingly the lower limits of antioxidant to be added are the same as heretofore known to the art. In general, the polyphenolic antioxidants should be present in the fat in the range of from 0.002% to 0.2%, the gallates and NDGA generally ranging up to about 0.01% by weight based on the fat.

While the present invention is directed broadly to the formation of antioxidant compositions for addition to any fat, in the case of shortenings or other products which conventionally contain monoglycerides it is possible to incorporate the antioxidants directly into the monoglycerides to be used in making the product. The antioxidants must, however, be in solution in the monoglyceride in order for effective inhibition of the discoloration-producing tendencies of the antioxidants.

Obviously, many modifications and variations of the invention as hereinbefore set forth may be made without departing from the spirit and scope thereof, and therefore only such limitations should be imposed as are indicated in the appended claims.

We claim:

1. A method for inhibiting the discoloration producing tendencies of polyphenolic fat antioxidants in triglyceride shortenings which comprises dissolving a polyphenolic fat antioxidant from the group consisting of gallic acid and alkyl esters of gallic acid in an amount of at least 0.002% by weight of said shortening and an acidic stabilizer in an amount of at least 0.001% by weight of said shortening in a molten monoglyceride; and thereafter incorporating the solution thus formed into said shortening.

2. The method of claim 1 wherein the acidic stabilizer is citric acid.

3. The method of claim 1 wherein the acidic stabilizer is phosphoric acid.

4. The method of claim 1 wherein the acidic stabilizer is aconitic acid.

5. The method of claim 1 wherein the antioxidant is propyl gallate.

6. The method of claim 1 wherein the monoglyceride solvent is present in a mixture containing about 40% monoglyceride from the group consisting of monostearyl, mono-oleyl and monopalmityl glycerides and mixtures thereof, the balance of said mixture comprising a mixture of diglycerides and triglycerides.

7. A method for inhibiting the discoloration producing tendencies of polyphenolic fat antioxidants in triglyceride shortenings which comprises dissolving a polyphenolic fat antioxidant from the group consisting of gallic acid and alkyl esters of gallic acid in an amount between 0.002–0.01% by weight of said shortening and an acidic stabilizer in an amount between 0.001–0.01% by weight of said shortening in a molten monoglyceride; and thereafter dissolving the solution thus formed in a molten shortening.

8. The method of claim 7 wherein said acidic stabilizer is from the group consisting of citric acid, phosphoric acid, and aconitic acid.

9. The method of claim 7 wherein the monoglyceride solvent is present in a mixture containing about 40% monoglyceride from the group consisting of monostearyl, mono-oleyl and monopalmityl glycerides and mixtures thereof, the balance of said mixture comprising a mixture of diglycerides and triglycerides.

10. The method of claim 7 wherein the antioxidant is propyl gallate.

11. The method of claim 10 wherein the acidic stabilizer is from the group consisting of citric acid, phosphoric acid and aconitic acid.

12. The method of claim 11 wherein the monoglyceride solvent is present in a mixture containing about 40% monoglyceride from the group consisting of monostearyl, mono-oleyl and monopalmityl glycerides and mixtures thereof, the balance of said mixture comprising a mixture of diglycerides and triglycerides.

References Cited in the file of this patent

UNITED STATES PATENTS

| | | |
|---|---|---|
| 2,377,610 | Brown | June 5, 1945 |
| 2,511,803 | Hall | June 13, 1950 |
| 2,535,910 | Fonyo | Dec. 26, 1950 |
| 2,638,475 | Ross | May 12, 1953 |
| 2,645,581 | Robison | July 14, 1953 |